United States Patent [19]
Walters

[11] 3,708,231
[45] Jan. 2, 1973

[54] PRECISION ANGLE MEASURING DEVICE

[76] Inventor: Glenn A. Walters, 12900 Camino Del Valle, Poway, Calif.

[22] Filed: Nov. 10, 1969

[21] Appl. No.: 870,376

[52] U.S. Cl. ............... 356/152, 356/149, 250/235, 250/220 R
[51] Int. Cl. ............................................. G01b 11/26
[58] Field of Search...... 356/141, 149, 150, 152, 138; 250/216, 235, 220 R; 33/72

[56] References Cited

UNITED STATES PATENTS

| | | | |
|---|---|---|---|
| 3,232,164 | 2/1966 | Kern et al. | 356/152 |
| 2,920,529 | 1/1960 | Blythe | 350/285 |
| 3,192,393 | 6/1965 | Brodersen | 250/235 |
| 3,360,324 | 12/1967 | Hora | 350/160 |

FOREIGN PATENTS OR APPLICATIONS

| | | | |
|---|---|---|---|
| 884,381 | 12/1961 | Great Britain | 356/138 |
| 454,478 | 6/1968 | Switzerland | 356/152 |
| 598,579 | 5/1960 | Canada | 356/141 |

Primary Examiner—Benjamin A. Borchelt
Assistant Examiner—S. C. Buczinski

[57] ABSTRACT

A device for the precision measuring of angular movements. The device incorporates an optical lever utilizing a predetermined number of reflections to increase the displacement of a light beam to be read out by discrete sensors. Ambiguities resulting from the amplification of displacement are resolved by determining displacement at a plurality of points of reflection and by using periodic logic on the sensor outputs.

4 Claims, 7 Drawing Figures

PATENTED JAN 2 1973 3,708,231

INVENTOR.
BY Glenn A. Walter

PRECISION ANGLE MEASURING DEVICE

This invention relates to precision angle measuring devices capable of resolving small angular changes. The methods and instrumentalities comprising the invention are applicable to a multiplicity of precise angle measuring tasks as required in surveying, tool positioning, etc.

An angle is formed by two intersecting lines. Conventionally, an angular change is measured in terms of the arc travel of one line relative to the other at some given radial distance. The angular sensitivity of the measuring device can be defined in terms of the arc travel for a specified change in angle; for example, millimeters per arc second. The effectiveness of an instrument as an angle measuring device is determined by such criteria as amplification, resolution, and repeatability.

A primary object of the present invention is to provide new and useful improvements in precision angle measuring instruments, utilizing the principles of geometric optics to improve their angular sensitivity. A collimated beam of light is subjected to multiple reflections between mirrors to provide both "base lines" and "progressive angle" amplification.

These terms are described by reference to FIGS. 1, 2, and 3 as follows.

Figure 1:
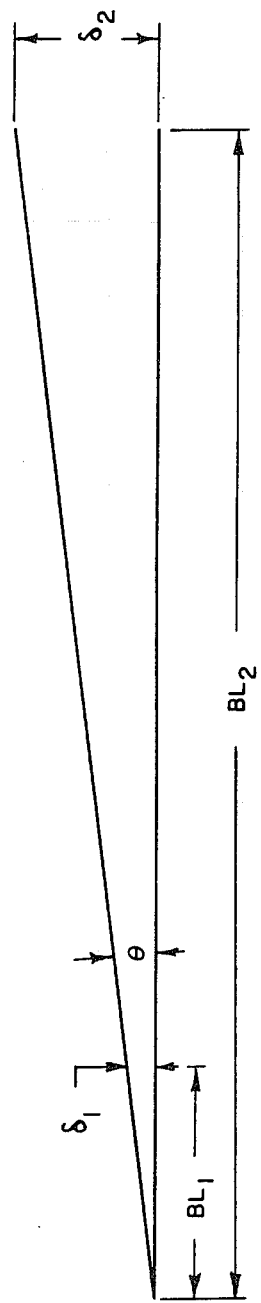
FIG. 1 is a simple geometric sketch to indicate a fundamental relationship wherein angular sensitivity is increased by lengthening the base line.

Referring to FIG. 1, a well-known geometric relationship is diagrammatically shown where, for a given angular displacement $\theta$, the magnitude of the normal displacement $\delta$ is proportional to the length of the baseline BL. If $BL_2$ is five times $BL_1$, then by similarity, $\delta_2$ is five times $\delta_1$. The angular sensitivity of the measurement system in terms of $\delta_2/\theta$ relative to $\delta_1/\theta$ is increased by a factor of five. The utilization of the principles presented here provides a means of effectively lengthening the reference baseline within a physically restricted area.

Figure 2:
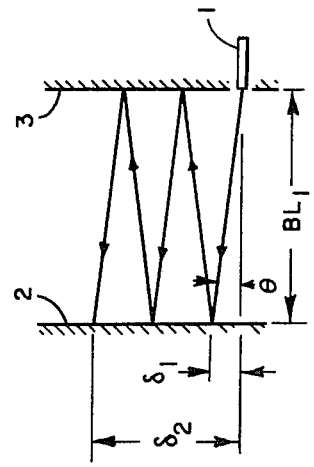
FIG. 2 is a simple geometric sketch describing "base line amplification."

In FIG. 2, a beam from a collimated light source 1 is made incident on mirror 2 and reflected to parallel mirror 3. Multiple reflections are incurred. Based on the laws of geometric optics, the angle of incidence is equal to the angle of reflection. To correspond with the geometry of FIG. 2, envision the mirrors separated by a distance equal to $BL_1$. Displacement of the originating incident ray on mirror 2 is equal to $\delta_1$. The light beam, upon its fifth traverse between mirrors, has traveled a distance $BL_2$, and the total displacement from the reference beam is $\delta_2$. The angular sensitivity of such a system is now proportional to the separation between mirrors and the number of reflections incurred. This phenomena shall be referred to as "baseline amplification."

If one or more of the mirrored surfaces subjected to multiple reflections are angularly oriented (one to the other) by an angle proportional to the angular displacement to be measured, an angular amplification is realized. The offset of the light beam is progressively increased upon each reflection and the normal beam displacement corresponding to a given angular displacement is further increased. This principle is better understood by reference to FIG. 3. In this drawing, the two mirrors 2 and 3 are parallel, one to the other, when the displacement angle equals zero. The collimated light source 1 directs its beam normal to mirrored surface 2. If, for example, mirror 2 is rotated $\theta°$ from its reference position, the initial incident beam is tilted $2\theta°$ from normal upon reflection. This beam, now made incident upon mirror 3, is redirected upon reflection to mirror 2. Upon reflection, the angular offset of the beam from normal is again advanced $2\theta°$ and has an angular offset from normal of $4\theta°$ when made incident upon mirror 3. On each successive reflection from mirror 2, the angular offset advances an additional $2\theta°$. The angular sensitivity of the system is approximately proportional to the product of the distance between mirrors times the square of the number of beam traverses involved. This phenomenon shall be referred to as "progressive angle amplifications." Baseline and progressive angle amplifications of a collimated light beam can be used singularly or in combination to achieve high angular sensitivity.

A further object of the present invention is to determine the angle measurement by means of light sensors such as photodiodes. The overall angular sensitivity of the precision angle measuring device is dependent upon the resolution capabilities of the beam monitors. Any measuring device has a limiting resolution capability. After a predetermined number of reflections of a light beam utilizing the amplification principles outlined herein, the normal displacement between adjacent beams for the smallest displacement angle of interest has increased to a value that provides sufficient separations between adjacent beams for resolution by the light sensor coupling apertures. A matrix of sensors monitor the beam positions through transparent or partially mirrored surfaces. This matrix of sensors provides the input logic to the associated electronic circuitry and display to read angles in terms of degrees and fractions thereof; degrees, minutes, and seconds and fractions thereof, etc., in a decimal or binary format or any other definitive form. The electronic circuits available to perform this function are numerous and are easily within the current state-of-the-art.

Generally, the design objective is to make the physical size of the monitoring apertures and associate sensors as small as feasible. Special techniques, such as those presently used in the manufacture of solid state integrated circuits, can be employed to manufacture miniaturized photodiode matrices. Such matrices, or more conventional diodes arrayed to form a matrix, are directly coupled or indirectly coupled through fiber optics to the light beam source.

It is further evident that the resolution capability of the system is affected by the spot size and optical characteristics of the collimated light beam. A solid state laser (monochromatic light beam source) with appropriate collimating lenses is utilized. This provides a minimum spot size and eliminates optical errors associated with chromatic aberrations.

Another object of the present invention is to describe a logical arrangement of the monitoring devices and the mechanics of the system to provide accurate, nonambiguous angle measurements. Accuracy is enhanced by the simplicity of the system. Angular and baseline amplification, in combination with electronic monitoring, inherently eliminates backlash and other sources of error that can adversely affect repeatability. Amplification is increased as a function of the number of traverses of the beam between surfaces. The positional information contained in the final beam traverse provides the incremental logic for electronic translation to angle readout. Unless the system is properly mechanized, ambiguous measurements can be encountered. Measurement ambiguities are resolved by the mechanics of the beam control mechanism, the logic used in arranging the diode sensors and the associated electronic circuits. Referring to FIG. 2, a light beam displacement $\delta_2$ is achieved at an angular displacement $\theta$ with 5 beam traverses. The same light beam displacement $\delta_2$ can be achieved at a larger angular displacement with 3 or 1 beam traverses or at a smaller angular displacement with 7 or more beam traverses. Similar reasoning is applicable to FIG. 3. The distance between successive reflection points on any given mirror is geometrically related to previous distances, and a periodicity becomes evident at any given measurement point as the measured angle changes. In either case, i.e., baseline or progressive angle amplification, there exists a specific periodicity within the pattern of the light beam reflection that is unique for each angle of interest. This characteristic can not only be used to eliminate measurement ambiguities but can, as will be shown later, be used to minimize the number of sensors required. Two factors are of primary importance within the periodicity characteristics of the multiple-reflection beam pattern. First, the greater the angle displacement, the greater the physical displacement between adjacent beams. Second, with certain mechanizations there are areas along the multi-reflection surfaces that are occupied by beam reflections from a sector of small angles but not by beam reflections from a sector of larger angles. Ambiguities in beam sensing can be avoided by: Restricting the angular range to be measured within a specific instrumentation element such that measurement ambiguities are not involved; sensing the number of reflections falling within a given area; determining the incremental distance between adjacent beam reflections; or by separately determining, through beam pattern monitoring, the angular sector in which the angle lies, and then refining the measurement by determining the particular angular increment within that sector. The geometric arrangement for the latter are numerous and are best chosen in accordance with the readout logic desired, i.e., degrees, minutes and seconds; decimal, binary, etc. It is evident that this technique can be used to reduce the number of monitoring sensors required.

Figure 3:
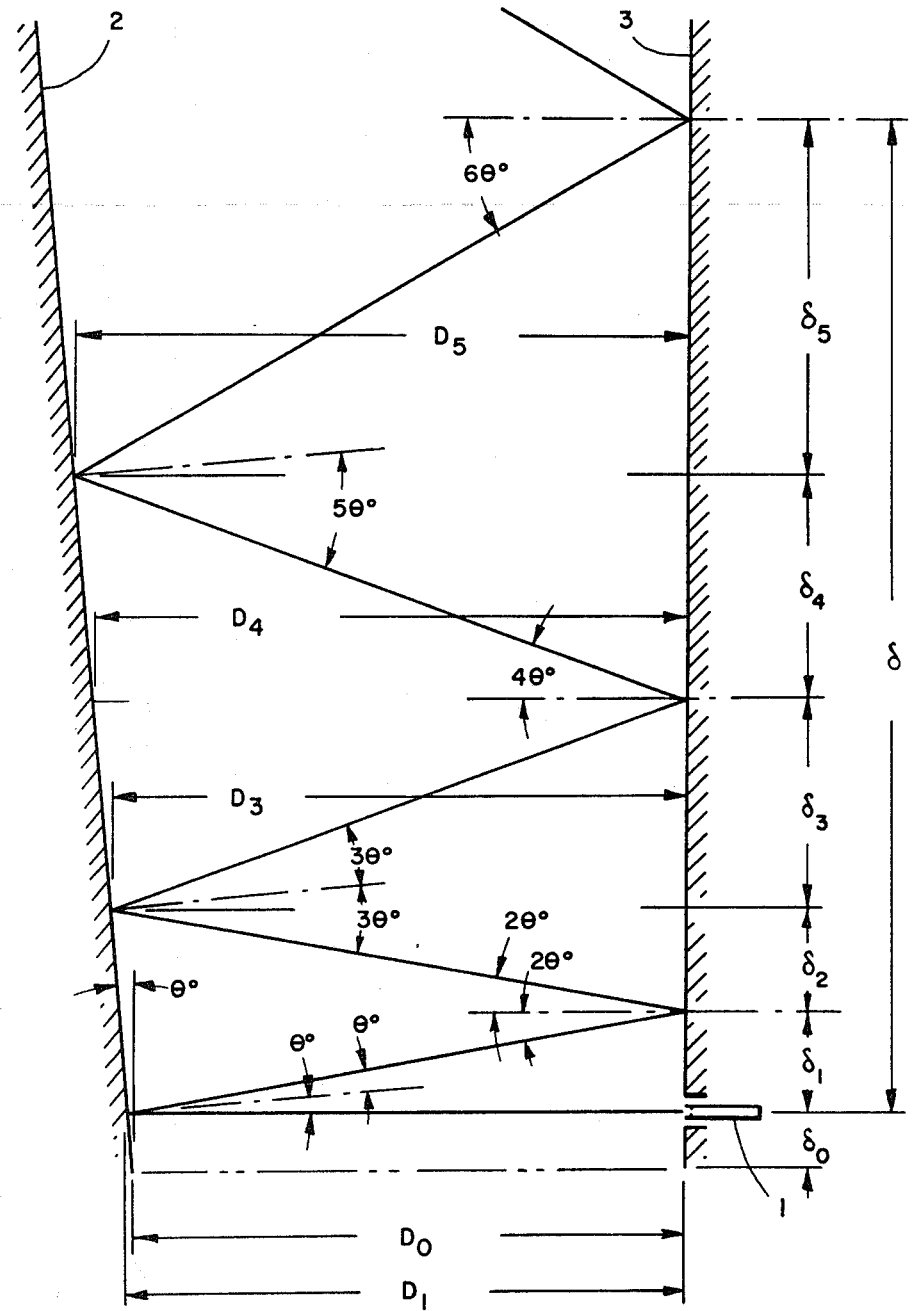
FIG. 3 is a simple geometric sketch describing "progressive angle amplifications."

Another object of the present invention is to describe a logical arrangement of monitoring devices and system mechanics to provide accurate, non-ambiguous angle measurements utilizing a progressive angle amplifier having a known angle amplification. Referring to FIG. 3 and establishing a value for the angle $\theta$ and the height of mirror 2, it is evident that after a determinable number of reflections the light beam will pass over mirror 2. If the variable angle to be measured is now in space quadrature with the angle $\theta$, and mirror 2 and 3 are made wide enough to reflect all such angles of interest, then that angle will be subjected to the same and determined angle amplification.

Methods of controlling beam path, amplification factor and detection, and various other objects of the present invention will become more apparent in conjunction with FIGS. 4, 5, 6, and 7.

Figure 4:
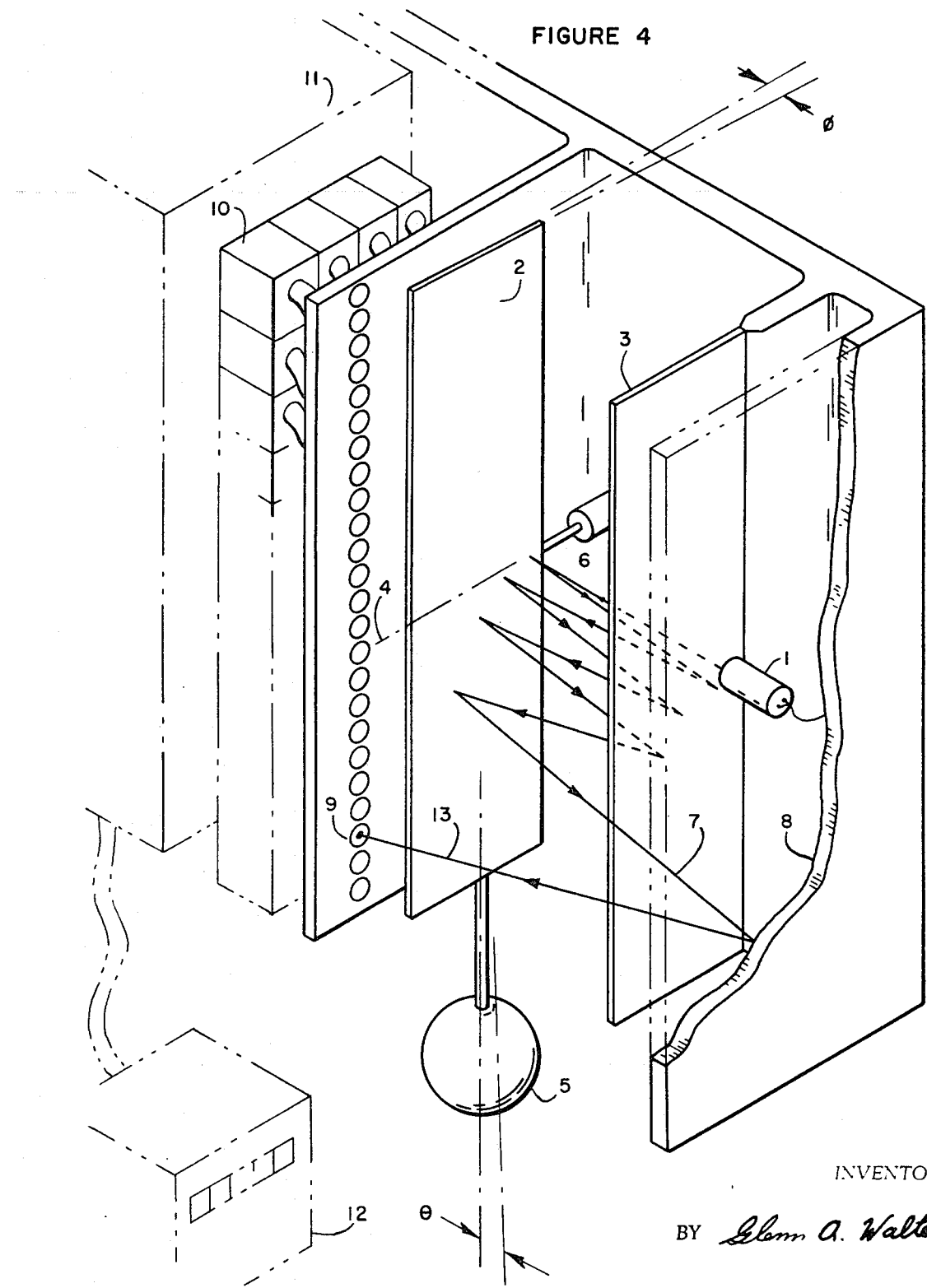
FIG. 4 is a perspective view illustrating an inclinometer incorporating a precision angle measuring device.

A typical application of the techniques described herein is incorporated within the mechanisms of an inclinometer shown in FIG. 4. The purpose of this specific device is to measure angles off vertical.

A collimated light ray 6 from source 1 is made incident upon mirror 2 and reflected to mirror 3. Mirror 2 is free to rotate around axis 4 and is gravity stabilized in the vertical plane by plumb bob 5. The emitted beam 6 is arranged normal to the plane of mirror 3. At zero reference (mirror 2 vertical) mirror 3 is parallel to mirror 2 in the vertical plane but offset by a small predetermined angle in the horizontal plane. This fixed offset angle $\phi$ precisely establishes the number of beam traverses between mirrors 2 and 3, thus providing a known progressive angle amplification. Any change in the vertical angle $\theta$ will not change the horizontal positioning of any reflection point, and hence beam traverse 7 will always miss mirror 3. The angle $\phi$ permits the sensor array 9 to be arranged vertically as shown. A change in the vertical angle will introduce a vertical movement at each reflection point on mirrors 2, 3, and 8, and, therefore, the vertical position of the final beam traverse 13 incidence on sensor array 9. This vertical movement along the sensor array 9 is made large by virtue of the progressive angle amplification introduced by the fixed number of traverses of the beam while between mirrors 2 and 3 and the baseline amplification while between mirrors 2 and 7. The beam position is now monitored by sensor array 9 consisting of fiber optic coupled photodiodes 10. In this design, an individual sensor is employed to monitor each beam position of interest. Small angular displacements are detected by the central sensors, large angles by the outer sensors. Clockwise rotations from zero reference are monitored by the lower half of the diode array; counterclockwise by the upper half of the diode array. Measurement ambiguities are eliminated by controlling the number of reflections involved in progressive angle amplifications and the limited size and number of mirrors involved in baseline amplification.

Basically, there is only one beam position on the array for each incremental angle of interest. By inspection, however, it is evident that a beam related to a small angle can be reflected off a monitoring aperture back to mirror 8 and again to a position of greater displacement on array 9. This form of measurement ambiguity can be eliminated by making the array of monitoring apertures essentially nonreflective, by utilizing proper electronic logic wherein only the smaller angle is presented, or by using a combination of both techniques. The outputs from the photosensors are scanned electronically in the direction of increasing angle in both the clockwise and counterclockwise direction to determine the exact number of non-illuminated fiberoptic ends that occur in a given situation prior to encountering an illuminated fiberoptic end.

The control signal is applied to suitable output devices 12 which may include an illuminated decimal readout, a printout device, a magnetic tape recorder, a buffer to supply data to a computer or other data processing or storage devices. The angle readout can be in terms of degrees and fractions thereof; degrees, minutes, and seconds and fractions thereof; in a decimal or binary format; or any other definitive form. For any one form there are optimum mechanical arrangements for the monitoring apertures. The electronic circuits available to perform these functions are numerous and are easily within the current state-of-the-art.

Figure 5:
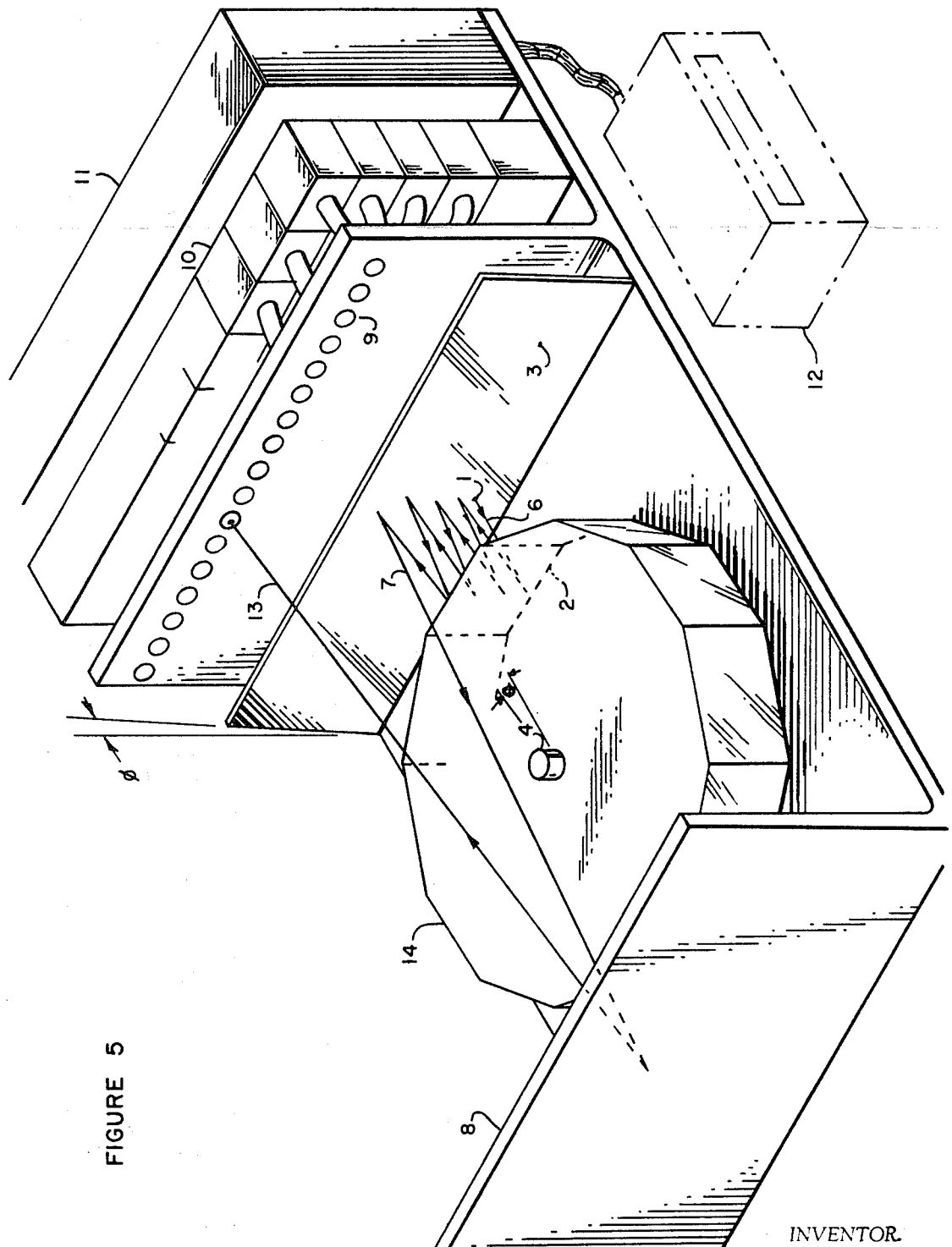
FIG. 5 is a perspective view illustrating an angle encoder incorporating a precision angle measuring device.

To further illustrate applicability, a variation of the same invention is incorporated within the mechanism of continuous rotating angle encoder shown in FIG. 5. For clarity of description, the number designations of items in FIG. 5 serving simular functions to those depicted in FIG. 4 have been made identical to those employed in FIG. 4.

Referring to FIG. 5, a collimated light ray 6 from source 1 is made incident upon mirror 2 and reflected to mirror 3. Mirror 2 is one of many simular mirrored facets on the rotor assembly 14, which is free to rotate around axis 4. The emitted beam 6 is arranged normal to the plane of mirror 3. At zero reference, mirror 3 is parallel to mirror 2 in the plane of rotation but offset by a small, predetermined angle $\phi$ in the normal or vertical plane. This fixed offset angle $\phi$ precisely establishes the number of beam traverses between mirrors 2 and 3 thus providing a known progressive angle amplification.

Any change in the rotation angle $\theta$ will not change the vertical positioning of any reflection point and hence beam traverse 7 will always miss mirror 3. The angle $\phi$ permits the sensor array 9 to be arranged horizontally as shown. A change in the rotational angle will introduce a horizontal movement of each reflection point on mirrors 2, 3, and 8, and the final position of beam traverse 13 incidence on sensor array 9. This horizontal displacement along the sensor array 9 is made large by virtue of the progressive angle amplification introduced by the fixed number of traverses of the beam while between mirrors 2 and 3 and the baseline amplification while between mirrors 2 and 7.

The beam position is now monitored by sensor array 9 consisting of fiber optic coupled photodiodes 10. In this design, an individual sensor is employed to monitor each beam position of interest. Small angular displacements are detected by the central sensors, larger angles by the outer sensors. Clockwise rotation from zero reference is monitored by the clockwise group of photodiodes, counterclockwise rotation by the counterclockwise group of photodiodes.

It is evident that with continuous rotation, the mirrored facets on rotor 14 are sequentially brought into position. Each mirrored facet represents an incremental angle change that is large compared to the angle increments measured by the precision angle measurement elements. These incremental changes can be measured by a number of techniques readily available from the state-of-the-art. For example, in a binary system a binary grating in combination with secondary light sources can be used. Cam operated switches are also applicable. The precision angle measuring technique is used to measure the least significant or small angle increments.

The control signal is applied to suitable output devices 12 which may include an illuminated decimal readout, a printout device, a magnetic tape recorder, a buffer to supply data to a computer or other data processing or storage devices.

Figure 6:
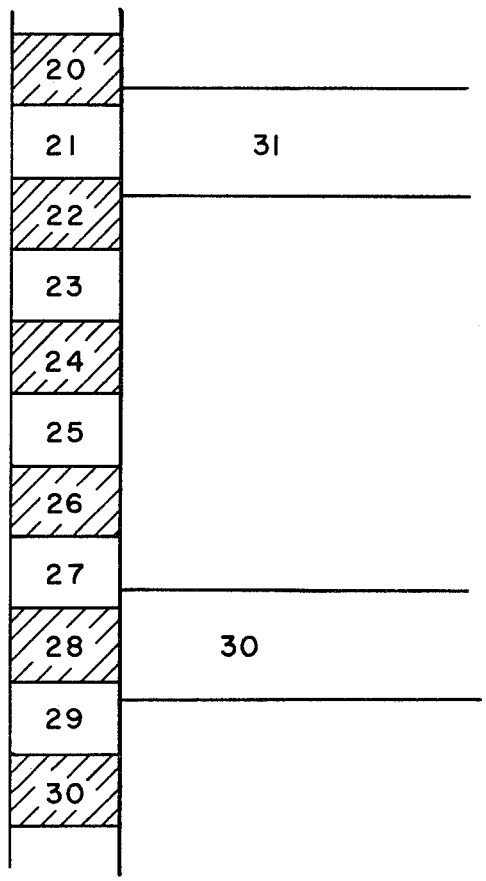
FIG. 6 is a diagrammatic illustration of a modified sensor array.

A technique for reducing the number of monitoring sensors required to measure a given number of angle increments is shown in FIG. 6. The monitoring apertures 20, 22, 24, 26, and 28 are separated by unmonitored apertures of equal size 21, 23, 25, 27, and 29. In this design, a printed photodiode matrix is envisioned. The beam width of the collimated beam 30 is half again as large as one of the aforementioned monitored or unmonitored areas. Light beam 30 is so situated that it only illuminates photosensor 28. The corresponding beam position is 28. An alternate position for the light beam 31 is also shown wherein two photosensors 20 and 22 are illuminated. The corresponding beam position is 21. The simultaneous monitoring of a beam by two adjacent sensors indicates a beam position between them. The monitoring of a beam by one sensor indicates a coincident beam position.

To eliminate ambiguous situations, the sensor array surface is made non-reflective, or the smaller angle beam position sensed is the controlling factor in angle readout. Using this spacing technique, each sensor can be used to sense two discrete angles. This reduces the number of sensors and diodes to one-half the number required in the device described in FIG. 4.

Figure 7:
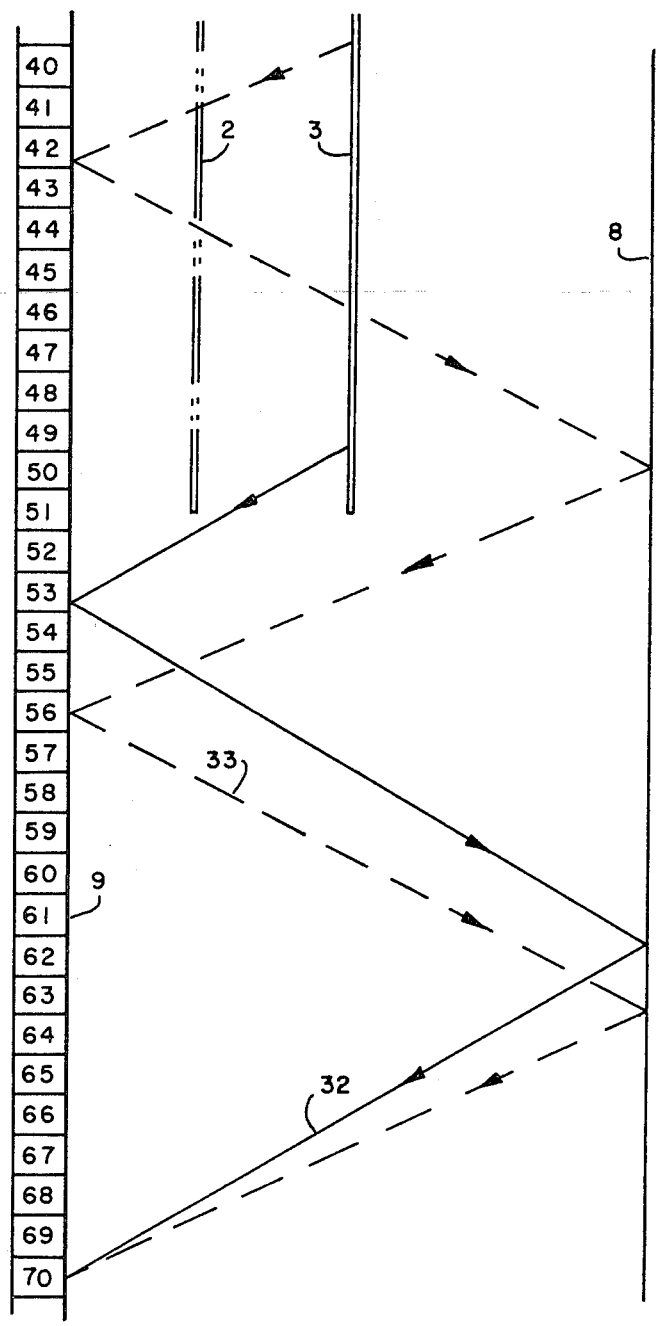
FIG. 7 illustrates a modified sensor array design to detect beams over a wide range of angles without ambiguous readouts.

A second technique for reducing the number of monitoring sensors required to measure a given number of angular increments is shown in FIG. 7. "Semi-reflective incremental" sensors are used in positions 56 through 70. These sensor positions are coincident with beam positions corresponding to incremental changes in the larger angles to be measured. Light beams originating from large angles, typically beam 32, are incident on sensor array 56 through 70 only once, while smaller angles, typically beam 33, are incident two or more times. Large angles are determined by the physical displacement of the beam along the array, while smaller angles are determined by the distance between adjacent beams within the array. Techniques such as this, or this technique in combination with other techniques relates to beam periodicity, and in further combination with those techniques described in FIG. 6, provide incremental readout with a minimum number of sensors.

From the diverse forms of equipment in which the invention can be embodied and the comments which have been made thereto, it should be evident that the particular forms are merely illustrative of a few of the many which the invention may take. There are many known equivalents for each of the elements that have been described. Those which have been described in detail constitute only a few of such possible equivalents. The invention, therefore, is considered to

Having thus described the invention, what I claim and desire to secure by letter patent is:

1. A device for measuring angles comprising:
a housing;
first mirror means for rotatably moving an angular amount on said housing proportional to an angle to be measured;
second mirror means;
said first and second mirror means having reflective surfaces means for being opposed one to the other for any angle within the range to be measured;
the angle to be measured relates to the angular displacement between the axis of the two mirrors in the plane of rotation;
the plane of the second mirror is offset from parallel relative to the first mirror in the line of the axis of rotation by a fixed offset angle;
light beam source means for producing a light beam that is reflected between said first and second mirror means a fixed number of times determined by said offset angle;
additional mirror means may be included within the light path, whereby the optical leverage and the instrument configuration may be improved;
sensing means for sensing the linear position of said light beam after said light beam has been reflected between said first and second mirror means, and providing an unambiguous angular reading.

2. The device of claim 1 wherein the number of monitoring sensors required to measure a given number of angular increments are reduced:
said sensing means comprises a photosensitive array of discreet photo sensitive elements of a specified width separating each from the other by said specified width;
the beamwidth of the light beam source as measured along the photosensitive array is half again as wide as said specified width;
wherein the simultaneous monitoring of a beam by two adjacent sensors indicates a beam position between them and the monitoring of a beam by one sensor indicates a coincident beam position;
thus, each sensor is used to sense two discreet angle increments.

3. A device for measuring angles comprising:
a housing;
first multi-surfaced mirror means for rotatable moving an angular amount on said housing proportional to an angle to be measured;
second mirror means;
the multi-surface of the first mirror and second mirror means having reflective surfaces means for being opposed one to the other for any angle within the range to be measured;
the multiple-surfaces of the first mirror are geometrically arranged to become reflective to the second mirror in a sequential and similar manner;
the angle to be measured relates to the angular displacement between the axis of the two mirrors in the plane of rotation;
the plane of the second mirror is offset from parallel relative to the axis of rotation of the first mirror by a fixed offset angle;
light beam source means for producing a light beam that is reflected between said first and second mirror beams a fixed number of times determined by said fixed offset angle;
additional mirror means may be included within the light path, whereby the optical leverage and the instrument configuration may be improved;
sensing means for sensing the linear position of said light beam after said light beam has been reflected between said first mirror and second mirror means;
a second sensing means for sensing the rotary position of the first mirror to determine which of the multi-surfaces is involved in the light reflective process;
and a means to combine the output from the two sensing means to provide a discreet angle measurement in an unambiguous manner throughout the angular range of the device.

4. A sensing means wherein the number of monitoring sensors required to measure a given number of angular increments are reduced:
said sensing means comprises a photosensitive array of discreet semireflective photosensitive elements lying within the light beam path;
wherein said sensing means derives angular measurements by sensing the number of light reflections and spacing between light reflections along the array.

\* \* \* \* \*